(12) United States Patent
Hasenfratz et al.

(10) Patent No.: US 10,071,330 B2
(45) Date of Patent: Sep. 11, 2018

(54) FILTER ELEMENT, IN PARTICULAR FOR GAS FILTRATION

(71) Applicant: Mann+Hummel GMBH, Ludwigsburg (DE)

(72) Inventors: Robert Hasenfratz, Waiblingen (DE); Fabian Wagner, Moeglingen (DE); Andre Roesgen, Remshalden (DE); Christian Thalmann, Speyer (DE); Frank Pflueger, Sachsenheim (DE); Christoph Wittmers, Bietigheim-Bissingen (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 344 days.

(21) Appl. No.: 14/955,252

(22) Filed: Dec. 1, 2015

(65) Prior Publication Data

US 2016/0158682 A1 Jun. 9, 2016

(30) Foreign Application Priority Data

Dec. 4, 2014 (DE) .................. 10 2014 018 228

(51) Int. Cl.
*B01D 46/00* (2006.01)
*B01D 46/24* (2006.01)
*B01D 46/10* (2006.01)

(52) U.S. Cl.
CPC ....... *B01D 46/0005* (2013.01); *B01D 46/103* (2013.01); *B01D 46/2403* (2013.01)

(58) Field of Classification Search
CPC .............. B01D 46/0005; B01D 46/103; B01D 46/2403
See application file for complete search history.

(56) References Cited

U.S. PATENT DOCUMENTS

| 8,551,205 B2 | 10/2013 | Berisha | |
|---|---|---|---|
| 2005/0229563 A1* | 10/2005 | Holzmann | B01D 46/2414 55/502 |
| 2013/0152528 A1* | 6/2013 | Disson | B01D 46/0005 55/480 |

FOREIGN PATENT DOCUMENTS

| DE | 102004002293 A1 | 7/2005 |
|---|---|---|
| DE | 202005003046 U1 | 7/2006 |
| DE | 102008033044 B3 | 12/2009 |
| DE | 102010041657 A1 | 3/2012 |

* cited by examiner

*Primary Examiner* — Robert Clemente
(74) *Attorney, Agent, or Firm* — James Hasselbeck

(57) ABSTRACT

A filter element has a curved filter medium body, which at least partially encloses a flow chamber, and a carrier connector that is guided through the filter medium body. The carrier connector is a carrier of a sealing element for sealing the contact with a flow channel, wherein a section of the sealing element is arranged between the carrier connector and the filter medium body.

17 Claims, 5 Drawing Sheets

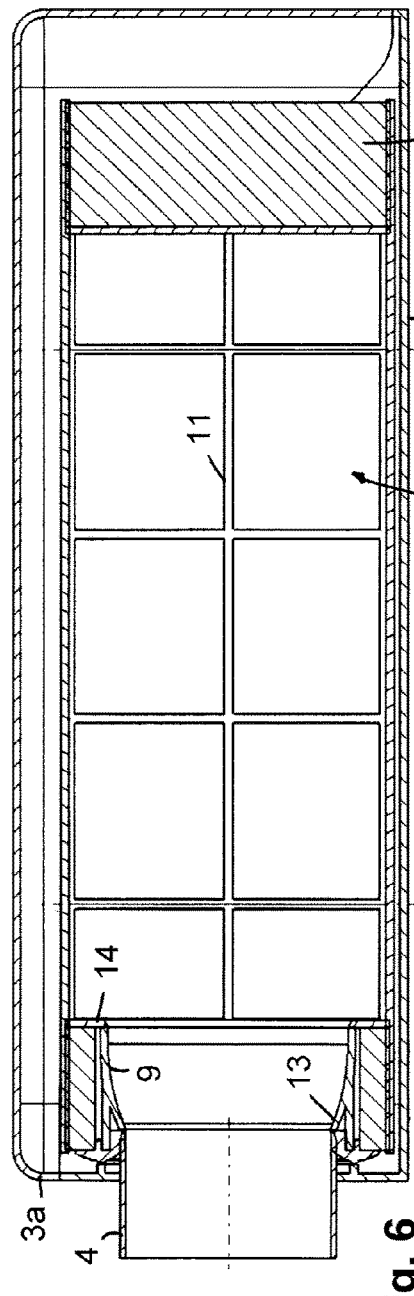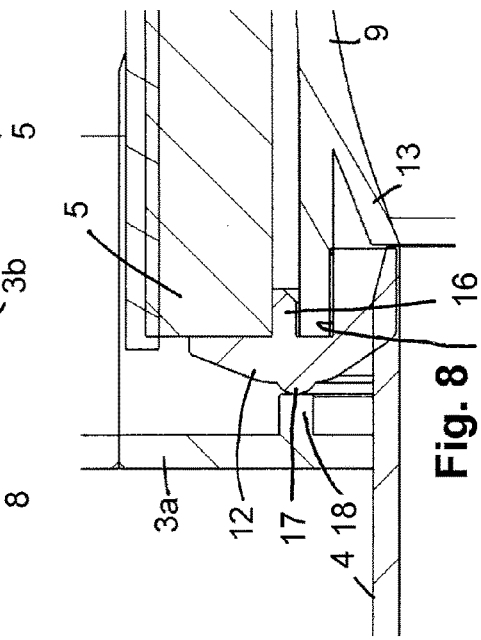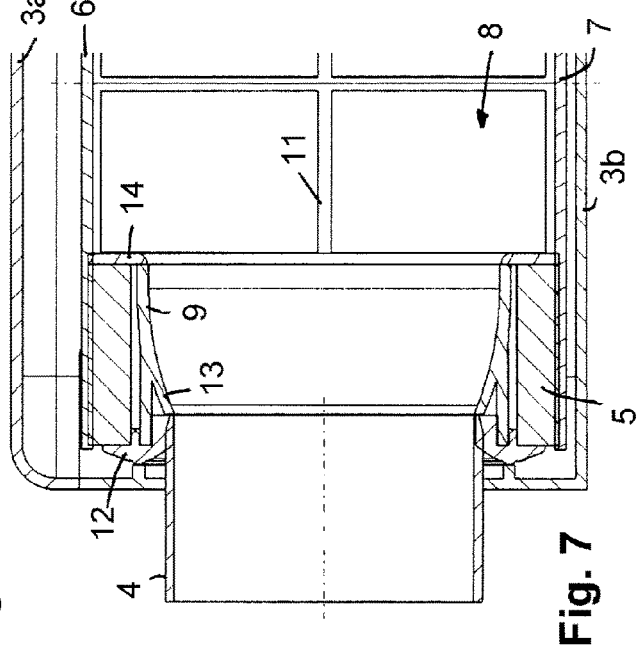

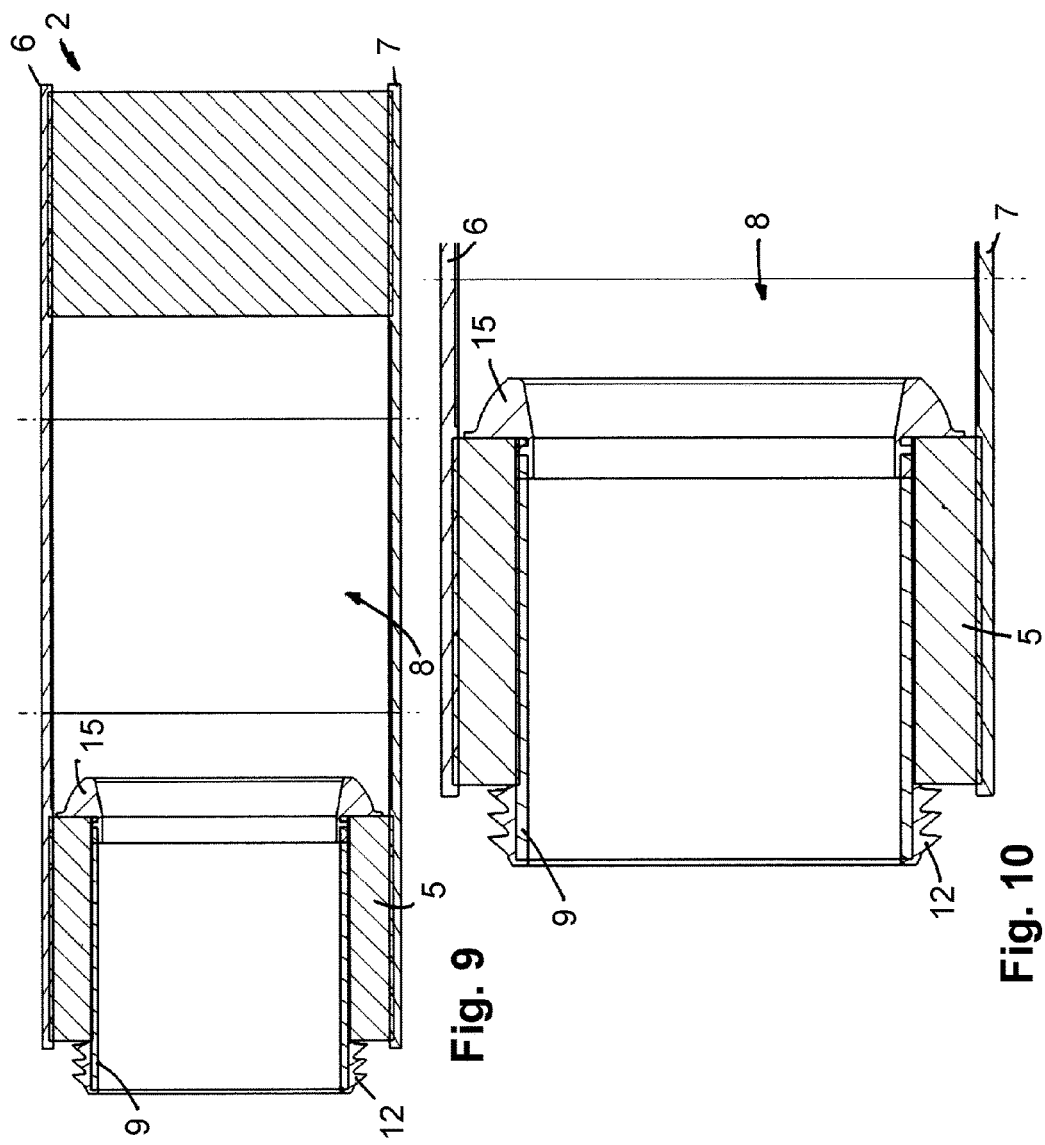

FILTER ELEMENT, IN PARTICULAR FOR GAS FILTRATION

TECHNICAL FIELD

The invention relates to a filter element, in particular for gas filtration, according to the preamble of claim 1.

BACKGROUND OF THE INVENTION

DE 10 2008 033 044 B3 discloses an annular filter element for a filter device, wherein the fluid to be purified can flow through the filter element radially from the outside to the inside, so that the enclosed inner flow chamber forms the clean side. A radially extending flow channel, by way of which the purified fluid is discharged from the enclosed flow chamber to the outside, is introduced into the wall of the filter medium body of the filter element which is designed as a pleated filter.

Reference is also made to DE 10 2010 041 657 A1 and EP 2 152 385 B1 with regard to the additional prior art.

SUMMARY

It is the object of the invention to create a filter element that has a simple design and comprises a curved filter medium body, wherein the flow chamber enclosed by the filter medium body is provided in a simple manner with a fluid connection, and the dirty side and clean side are separated from each other in a flow-sealed manner.

The filter element according to the invention is preferably used for gas filtration, for example for air filtration, and may be used as an air filter for an internal combustion engine, for example. However, it may also be used for liquid filtration.

The filter medium body of the filter element on which the filtration takes place has a curved or arched design, for example ring-shaped or partial ring-shaped, and at least partially encloses an interior flow chamber. The fluid to be purified typically flows radially through the filter medium body, in particular radially from the outside to the inside, so that the interior flow chamber forms the clean side. However, in principle a reverse radial incident flow is also possible, in which the interior flow chamber forms the dirty side.

The filter medium body can thus form a closed ring, so that the interior flow chamber is completely enclosed by the filter medium body in the radial direction. However, open configurations of the filter medium body are also possible, in which the filter medium body is not continuously closed in an annular shape, but is designed to be open on one side, for example a U-shaped filter medium body. The open side of the filter medium body is preferably closed by a component of the filter element, such as by a polymer panel or the like.

Furthermore, it is expedient that the filter element comprises an upper and a lower end cap on the filter medium body so as to separate the interior flow chamber from the surroundings in the axial direction.

A connector is guided through the filter medium body, preferably in the radial direction, ending on the interior flow channel on one side and adjacent to the outer side of the filter medium body on the other side. The connector creates a fluid connection between the interior flow chamber and the outer side, wherein a separately formed flow channel, through which fluid is conducted, is to be connected to the connector.

The connector is implemented as a carrier connector, which, in addition to establishing the fluid connection with the interior flow chamber, also has the task of receiving the flow channel and additionally at least one sealing element located in the contact region between the carrier connector and the flow channel, so that a flow-sealed connection of the flow channel to the carrier connector is possible.

A section of the sealing element may optionally be arranged between the carrier connector and the abutting filter medium body, so that a potentially existing air gap between the outer wall of the carrier connector and the surrounding filter medium body is sealed by the sealing element, and the risk of improper air flows is reduced. The sealing element therefore performs two different sealing functions: first, to provide sealing between the carrier connector and the flow channel to be connected, and secondly, to provide sealing between the carrier connector and the surrounding filter medium body. Overall, this results in a simplification of the composition of the filter element.

According to a further advantageous embodiment, the carrier connector is arranged in a cut-out of the filter medium body and completely surrounded by the same. The sealing element is expediently used to seal the contact between the carrier connector and the flow channel in the radial direction. For connection, the separately formed flow channel can advantageously be pushed into the carrier connector and the sealing element in the carrier connector. The sealing element and/or a further sealing element may be used to provide sealing between the carrier connector and the filter medium body.

According to an advantageous embodiment, the sealing element is located adjacent to the end face on the carrier connector which faces away from the interior flow chamber. The sealing element may extend over the end face of the carrier connector for this purpose or, according to a further embodiment, have an annular design and be arranged in particular on the outer side of the carrier connector. The contact with the filter medium body is established, for example, by way of a radially outwardly bent, hat-shaped and continuous annular section of the sealing element. In the case of a sealing element seated in an annular manner on the outer side of the carrier connector, this sealing element can be designed as a saw tooth seal, the one end face of which is in contact with the filter medium body.

It may be expedient to arrange a sealing element also on the end face of the carrier connector which faces the interior flow chamber, the sealing element being in particular present in addition to the radially outer sealing element. The interior sealing element advantageously encompasses the end face of the carrier connector and is in contact with the interior side of the filter medium body which faces the interior flow chamber. By providing two sealing elements on the axially opposing end faces of the carrier connector, a section of each of which is seated against the inner or outer side of the filter medium body, improved sealing with respect to improper air flows between the outer side of the carrier connector and the filter medium body is achieved.

According to a further advantageous embodiment, the carrier connector comprises a stop section that projects radially away from the cylindrical wall of the connector and is used to axially support the flow channel and/or the sealing element. The stop section in particular projects radially inwardly and is preferably designed in one piece with the wall of the carrier connector. The stop section, for example together with the wall, has a Y-shaped cross-section, wherein the leg of the Y shape which projects radially away forms the stop leg against which the flow connector, and advantageously also the sealing element, is seated and supported when the filter element is installed. In the undeformed state, for example, an annular section of the sealing element can project radially inwardly, wherein this section of the sealing element is bent axially by the flow channel to be inserted, so that the end face of the carrier connector is encompassed by the sealing element in a U-shaped manner. The flow connector is pushed axially into the carrier connector until the stop leg is reached; the bent section of the sealing element is then located on the outer side of the inwardly projecting flow channel, whereby the flow-sealed connection between the carrier connector and the flow channel is established. The stop leg advantageously ends axially at a distance from the end face of the carrier connector.

According to a further expedient embodiment, a sealing leg of the sealing element projects into a space between the carrier connector and the filter medium body. The sealing leg improves the flow-sealed design, and additionally the distance between the filter medium body and the carrier connector is stabilized.

According to still another expedient embodiment, the sealing element has a support elevation on the side facing away from the filter medium body, the support elevation being used to support a housing component, such as a housing shell, thereon. The support elevation is located, relative to the longitudinal axis of the carrier connector, radially approximately at the same height and axially opposite the sealing leg that projects into the space between the filter medium body and the carrier connector. The support elevation protrudes beyond the outer side of the sealing element, so that a defined support point or a support surface exists for the housing component and the carrier connector can absorb the support forces. The inner side of the housing component can comprise a protrusion, which is in contact with the support elevation.

According to a further expedient embodiment, the sealing element includes a sealing recess for receiving the end face of the carrier connector. The sealing recess can be delimited by the sealing leg, which advantageously projects into the space between the filter medium body and the carrier connector.

Additionally or alternatively, the sealing element optionally includes a sealing recess that is used to receive the end face of the flow channel. If two sealing recesses are introduced into the sealing element for receiving both the end face of the carrier connector and the end face of the flow channel, the open sides of the sealing recesses, relative to the longitudinal axis of the carrier connector, are located on axially opposing lateral surfaces of the sealing element and are advantageously arranged radially offset from each other.

If a stop leg is provided on the carrier connector, it may furthermore be expedient that the stop leg ends axially, relative to the longitudinal axis of the carrier connector, at a distance from the end face of the carrier connector.

According to a further advantageous embodiment, a support grid, which provides stabilization, is located on the filter medium body on the side facing the interior flow chamber. It may be expedient for the carrier connector to be axially supported on the support grid, wherein both immediate, direct contact between the carrier connector and the support grid is possible and indirect support by way of a further, interposed component, such as a sealing element.

The filter element can be inserted into a filter housing of a filter device that is used for gas or liquid filtration. The flow channel, which is to be connected to the carrier connector, may optionally be an integral part of the filter housing, for example of a housing shell that, together with a further housing shell, forms the filter housing.

BRIEF DESCRIPTION OF THE DRAWINGS

Further advantages and advantageous embodiments will be apparent from the remaining claims, the description of the figures, and the drawings. In the drawings:

FIGS. 6 to 8 are representations corresponding to FIGS. 3 to 5, wherein the filter element is inserted into the filter housing;

FIGS. 9 and 10 show a filter element in one variant embodiment in a sectional view.

In the figures, identical components are denoted by the same reference numerals.

DETAILED DESCRIPTION

Figure 1:
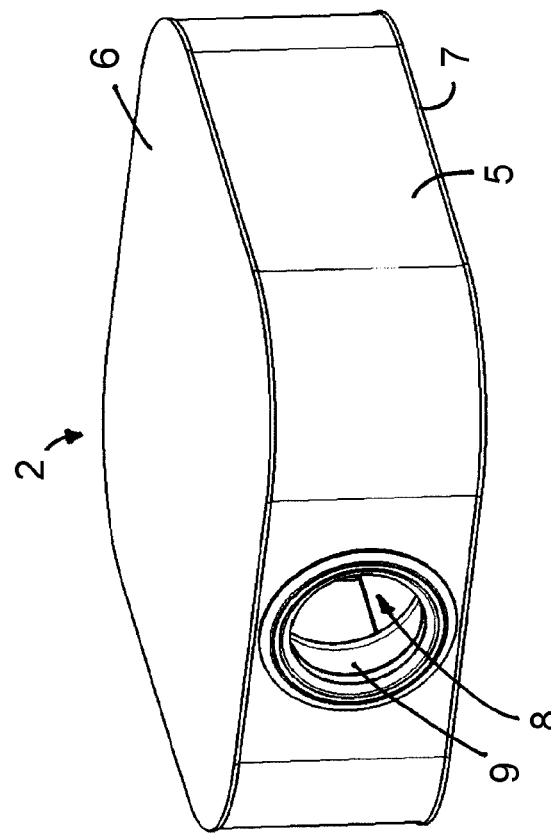
FIG. 1 shows an exploded view of a filter device for gas filtration, including an annular filter element and a filter housing composed of two housing shells.

FIG. 1 shows a filter device 1 for gas filtration. The filter device 1 comprises a filter element 2 and a filter housing 3, which is composed of two housing shells 3a, 3b, which can be assembled to form a closed housing. A flow channel 4 is integrated into the housing shell 3b and is designed in one piece with the housing shell 3b.

As is apparent from FIGS. 1 to 5, the filter element 2 comprises an annular filter medium body 5, which encloses an interior flow chamber 8. End caps 6 and 7, which are axially spaced apart from each other and oriented parallel to each other and which axially delimit the flow chamber 8, are located at the end faces of the filter medium body 5. The filter medium body 5 is made of a nonwoven fabric or a paper material, for example, and can be designed as a pleated filter. A carrier connector 9, which completely penetrates the wall of the filter medium body 5 in the radial direction and connects the flow chamber 8 to the surrounding area, is introduced into the filter medium body 5. The fluid to be purified typically flows radially from the outside to the inside through the filter medium body 5, so that the outer side of the filter medium body forms the dirty side, and the interior flow chamber 8 forms the clean side. The purified fluid can be discharged from the flow chamber 8 to the outside via the carrier connector 9. When the filter element is installed, the inwardly directed section of the flow channel 4 on the housing shell 3b projects into the carrier connector 9, wherein a hose or tube line, by way of which the purified fluid is discharged, can be connected to the outer section of the flow channel 4.

Figure 2:
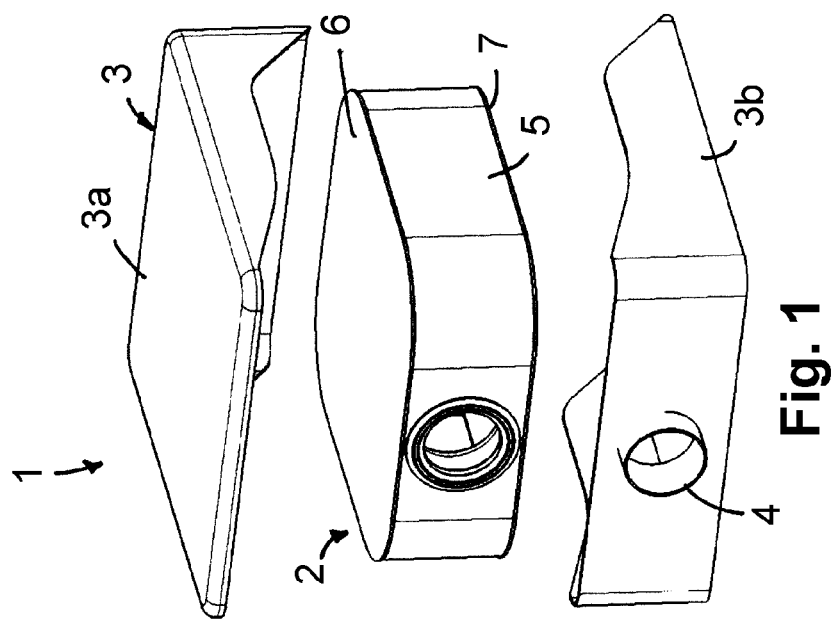
FIG. 2 shows the filter element in a perspective single representation.
Figure 3:
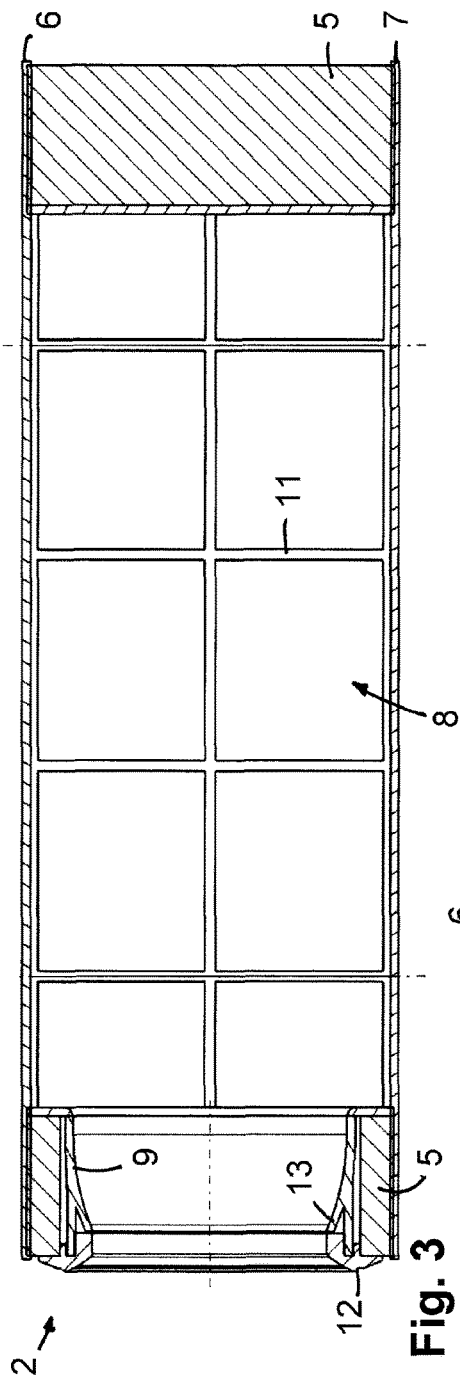
FIG. 3 shows a section through the filter element, including a carrier connector which extends through a filter medium body and on the inside wall of which, adjacent to the outer end face, an inwardly projecting stop leg is arranged, including a sealing element which is applied to the end face and which, radially to the outside, is seated against the surrounding filter medium body and, radially to the inside, is seated against the end face of the stop leg.
Figure 5:
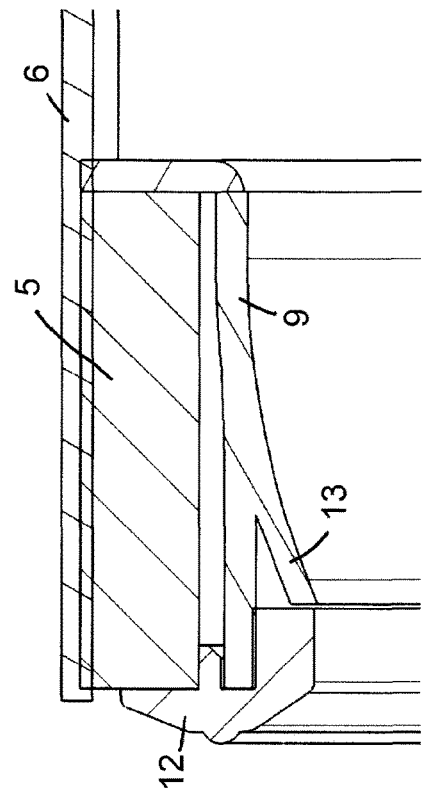
FIG. 5 shows a further enlarged representation of the carrier connector including a sealing element applied to the end face.
Figure 4:
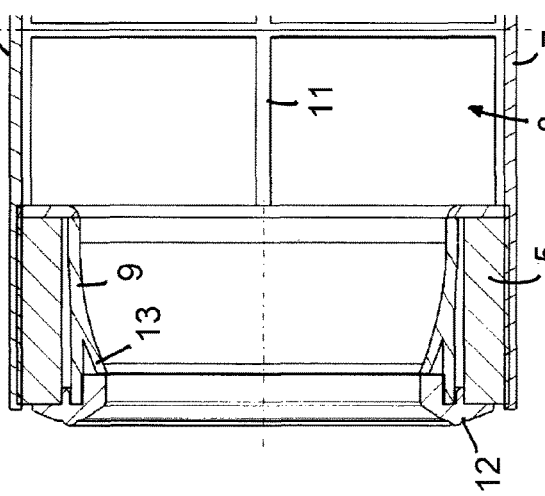
FIG. 4 shows an enlarged sectional view corresponding to FIG. 3 with the carrier connector.

FIGS. 3 to 5 show the filter element 2 from FIGS. 1 and 2 in a single representation in a sectional view, and FIGS. 6 to 8 show it when installed in the filter housing. The inner side of the filter medium body 5 is lined with a support rid 11, which is preferably designed as a polymer grid and imparts additional stability to the filter medium body on the clean side.

The carrier connector 9 extends through the filter medium body 5 in the radial direction and on the outer end face carries an annular sealing element 12, which extends over the outer end face of the carrier connector 9. A radially outwardly directed section of the sealing element 12 is seated against the outer side of the filter medium body 5, thereby sealing a peripheral annular gap between the outer side of the carrier connector 9 and the filter medium body 5. A sealing leg 16 of the sealing element 12 projects into the annular gap.

The sealing element 12 additionally comprises a radially inwardly directed, continuous annular section, which extends axially into the interior of the carrier connector 9. On the inner wall, the carrier connector 9 has a radially inwardly projecting stop leg 13, which forms a stop section and against the free end face of which the inwardly projecting section of the sealing element 12 is seated. When the filter element is installed (FIGS. 6 to 8), the flow channel 4 projects into the flow connector 9, wherein the axial end face of the flow channel 4 is seated against the end face of the stop leg 13, the free end face of which extends in the axial direction. The radially inwardly projecting section of the sealing element 12 is partially displaced by the flow channel 4 and compressed, whereby a compression of this section of the sealing element and a flow-sealed connection between the flow channel 4 and the carrier connector 9 is created. The stop leg 13 is designed in one piece with the wall of the carrier connector 9 and, together with the wall, has a Y shape. The stop leg 13 does not extend up to the end face of the carrier connector 9, but remains axially behind the end face, so that the flow channel 4 can be pushed axially over the open end face into the carrier connector 9 up to the stop on the stop leg 13. The sealing element 12 is thus located between the outer side of the flow channel 4 and the inner wall of the carrier connector 9.

On the side facing the flow chamber 8, the carrier connector 9 is supported on a ring 14, which is in turn supported on the support grid 11. The ring 14 extends radially further to the outside than the carrier connector 9 and is seated against the inner side of the filter medium body 5. The ring 14 may optionally also be implemented in one piece with the carrier connector 9.

As is furthermore apparent from FIG. 8, a sealing leg 16 is integrally formed on the sealing element 12 on the side facing the filter medium body 5, the sealing leg projecting into a space that is located radially—relative to the longitudinal axis of the carrier connector 9—between the filter medium body 5 and the carrier connector 9. The sealing leg 16 improves sealing and additionally stabilizes the relative position of the filter medium body 5 and the carrier connector 9 to each other.

A support elevation 17, on which an inwardly projecting protrusion 18 is supported on the housing shell 3a, is integrally formed on the outer side of the sealing element 12 on the side opposite the sealing leg 16. The support elevation 17 on the sealing element 12 is arranged opposite the end face of the carrier connector 9, so that supporting forces, which are introduced into the sealing element 12 via the protrusion 18 and the support elevation 17, are absorbed by the carrier connector 9.

FIGS. 9 and 10 show a filter element 2 in one variant embodiment in which the filter medium body 5 likewise has an annular design and encloses an interior flow chamber 8. Cover or end caps 6, 7 are arranged on the filter medium body 5, which axially delimit the flow chamber 8 and close the same in a flow-sealed manner. A carrier connector 9, which connects the flow chamber 8 to the outside, is introduced into a cut-out in the filter medium body 5.

On the side facing axially away from the flow chamber 8, the carrier connector 9 comprises an annular sealing element 12, which is implemented as a saw tooth seal and arranged adjacent to the outer end face of the carrier connector 9 on the outside wall. The sealing element 12 is in contact with the outer side of the filter medium body 5 and seals a potentially present air gap between the outer wall of the carrier connector 9 and the filter medium body 5.

The connection to the flow channel 4 is advantageously achieved by applying the flow channel to the outer side of the carrier connector 9 in the region of the seal 12, so that the saw teeth of the sealing element 12 are seated against the inner wall of the flow channel and establish a flow-sealed connection between the carrier connector 9 and the flow channel 4.

On the side facing the flow chamber 8, a second sealing element 15 extends over the end face of the carrier connector 9, a section of the second sealing element additionally extending radially outwardly and being seated against the inner side of the filter medium body 5. In this way, the sealing element 15 extends over a potentially present air gap between the outer side of the carrier connector 9 and the filter medium body 5 on the side facing the flow chamber 8. This significantly reduces the risk of improper air flows.

Figure 11:
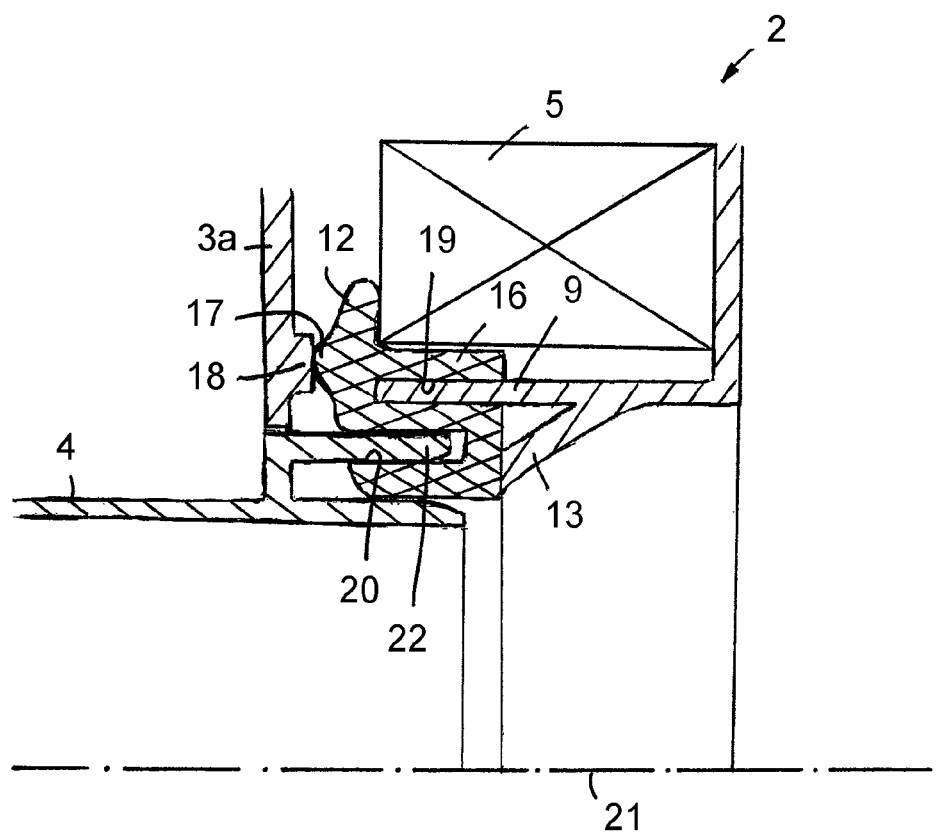
FIG. 11 shows a filter element in a further variant embodiment in a sectional view.

The exemplary embodiment according to FIG. 11, which shows a comparable view as in FIG. 8, shows the sealing element 12 and the flow chamber 4 in one variant embodiment. The sealing element 12 has a sealing recess 19, which is axially oriented relative to the longitudinal axis 21 of the carrier connector 9 and the flow channel 4, wherein the open side of the sealing recess 19 for receiving the end face is directed to the carrier connector 9. The sealing leg 16 delimits the sealing recess 19.

A second sealing recess 20, which is arranged radially offset from the first sealing recess 19 and arranged with the open side on the opposing axial lateral surface of the sealing element 12, is introduced into the sealing element 12. A leg 22 of the flow channel 4 projects into the second sealing recess 20, wherein the leg 22 has a continuous annular design and is offset radially to the outside relative to the end face of the flow channel 4 and may be slightly axially recessed. The leg 22 may optionally also have an interrupted design. A section of the sealing element 12 projects into the annular space on the flow channel 4, which is formed radially inwardly by the peripheral leg 22.

What is claimed is:
1. A filter element for gas filtration, including:
   a curved filter medium body, which at least partially encloses an interior flow chamber;
   a connector that is guided through the filter medium body and communicates with the interior flow chamber;
   wherein the connector forms a carrier connector, to which a separately formed flow channel can be connected;
   wherein the carrier connector forms a carrier for a sealing element for sealing between the carrier connector and the flow channel;
   wherein the sealing element and/or an additional sealing element are used to provide sealing between the carrier connector and the filter medium body; and
   wherein the additional sealing element is arranged on the end face of the carrier connector which faces the interior flow chamber.

2. The filter element according to claim 1, wherein the sealing element is arranged adjacent to the end face on the carrier connector which faces away from the interior flow chamber.

3. The filter element according to claim 1, wherein the sealing element or the additional sealing element is arranged in the region of the two axial end faces of the carrier connector and a remaining sealing element or the additional sealing element is arranged between the carrier connector and the filter medium body.

4. The filter element according to claim 1, wherein the sealing element is a saw tooth seal arranged on a wall of the carrier connector.

5. A filter element for gas filtration, including:
a curved filter medium body, which at least partially encloses an interior flow chamber;
a connector that is guided through the filter medium body and communicates with the interior flow chamber;
wherein the connector forms a carrier connector, to which a separately formed flow channel can be connected;
wherein the carrier connector forms a carrier for a sealing element for sealing between the carrier connector and the flow channel;
wherein a support grid is arranged on a flow face of the filter medium body on a side facing the interior flow chamber;
wherein the carrier connector is supported on the support grid.

6. The filter element according to claim 5, wherein the carrier connector is arranged in a cut-out of the filter medium body and is completely surrounded by the filter medium body.

7. The filter element according to claim 5, wherein the sealing element seals between the carrier connector and the flow channel, the sealing element forming a seal in a radial direction.

8. The filter element according to claim 5, wherein for connection, the separately formed flow channel can be pushed into the carrier connector and the sealing element in the carrier connector.

9. The filter element according to claim 5, wherein the carrier connector comprises a stop section that projects radially away from a cylindrical wall of the connector for axially supporting the flow channel and/or the sealing element.

10. The filter element according to claim 9, wherein the stop section on the carrier connector is a stop leg which is formed in one piece with the wall of the carrier connector.

11. The filter element according to claim 10, wherein the stop leg is spaced apart axially away from an adjacent end face of the carrier connector.

12. The filter element according to claim 5, wherein the sealing element, on the side facing away from the filter medium body, has a support elevation for supporting a housing component.

13. A filter element for gas filtration, including:
a curved filter medium body, which at least partially encloses an interior flow chamber;
a connector that is guided through the filter medium body and communicates with the interior flow chamber;
wherein the connector forms a carrier connector, to which a separately formed flow channel can be connected;
wherein the carrier connector forms a carrier for a sealing element for sealing between the carrier connector and the flow channel; and
wherein a sealing leg of the sealing element projects into a space between the carrier connector and the filter medium body.

14. A filter element for gas filtration, including:
a curved filter medium body, which at least partially encloses an interior flow chamber;
a connector that is guided through the filter medium body and communicates with the interior flow chamber;
wherein the connector forms a carrier connector, to which a separately formed flow channel can be connected;
wherein the carrier connector forms a carrier for a sealing element for sealing between the carrier connector and the flow channel; and
wherein the sealing element comprises a sealing recess adapted to receive the end face of the carrier connector.

15. The filter element according to claim 14, wherein the sealing element comprises a sealing recess adapted to receive the end face of the carrier connector;
wherein the sealing element comprises a second sealing recess adapted to receive the end face of the flow channel;
the sealing recess and the second sealing recess are offset from each other, and open sides of the sealing recess and the second sealing recess are arranged on opposing lateral surfaces of the sealing element.

16. A filter element for gas filtration, including:
a curved filter medium body, which at least partially encloses an interior flow chamber;
a connector that is guided through the filter medium body and communicates with the interior flow chamber;
wherein the connector forms a carrier connector, to which a separately formed flow channel can be connected;
wherein the carrier connector forms a carrier for a sealing element for sealing between the carrier connector and the flow channel; and
wherein the sealing element comprises a sealing recess adapted to receive the end face of the flow channel.

17. A filter device comprising
a filter element for gas filtration, including:
a curved filter medium body, which at least partially encloses an interior flow chamber;
a connector that is guided through the filter medium body and communicates with the interior flow chamber;
wherein the connector forms a carrier connector, to which a separately formed flow channel of a filter housing can be connected;
wherein the carrier connector forms a carrier for a sealing element for sealing between the carrier connector and the flow channel;
wherein the sealing element and/or an additional sealing element are used to provide sealing between the carrier connector and the filter medium body; and
wherein either:
the additional sealing element is arranged on the end face of the carrier connector which faces the interior flow chamber;
or:
a support grid is arranged on a flow face of the filter medium body on a side facing the interior flow chamber; and the carrier connector is supported on the support grid;
a filter housing receiving the filter element and having the separately formed flow channel that can be connected to the carrier connector.

* * * * *